United States Patent
Miyata et al.

(10) Patent No.: US 7,120,321 B2
(45) Date of Patent: Oct. 10, 2006

(54) CONTROL METHOD AND DEVICE FOR OPTICAL FILTER

(75) Inventors: Hideyuki Miyata, Kawasaki (JP); Yutaka Kai, Kawasaki (JP); Isao Tsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 10/265,767

(22) Filed: Oct. 8, 2002

(65) Prior Publication Data

US 2003/0123775 A1    Jul. 3, 2003

(30) Foreign Application Priority Data

Dec. 28, 2001    (JP)    ............................. 2001-399218

(51) Int. Cl.
*G02F 1/335*    (2006.01)
(52) U.S. Cl. .......................................... 385/7; 385/140
(58) Field of Classification Search .................. 385/7
See application file for complete search history.

(56) References Cited

U.S. PATENT DOCUMENTS

| 5,218,653 | A |   | 6/1993  | Johnson et al. |           |
|-----------|---|---|---------|----------------|-----------|
| 5,396,359 | A |   | 3/1995  | Abramovitz     |           |
| 5,652,809 | A |   | 7/1997  | Aronson        |           |
| 5,850,492 | A |   | 12/1998 | Morasca et al. |           |
| 5,915,051 | A | * | 6/1999  | Damask et al.  | ...... 385/16 |
| 6,370,167 | B1| * | 4/2002  | Donati et al.  | ...... 372/20 |
| 6,701,031 | B1| * | 3/2004  | Nakazawa       | ...... 385/7  |

FOREIGN PATENT DOCUMENTS

| EP | 0 948 153 A2 | 10/1999 |
| JP | 2001-144353  | 1/1925  |
| JP | 08-114776    | 5/1996  |
| JP | 08-211349    | 8/1996  |
| JP | 08-286160    | 11/1996 |
| JP | 09-090303    | 4/1997  |
| JP | 11-064809    | 3/1999  |

OTHER PUBLICATIONS

European Search Report dated Feb. 4, 2005.

* cited by examiner

*Primary Examiner*—Nikita Wells
*Assistant Examiner*—Phillip A. Johnston
(74) *Attorney, Agent, or Firm*—Staas & Halsey LLP (57) ABSTRACT

The present invention relates to a control method and device for an optical filter, and a primary object of the present invention is to achieve accurate tracking control of the optical filter. Disclosed herein is a control method for an optical filter including first and second optical filter units cascaded, each having an input and first and second outputs. The first output of the first optical filter unit is connected to the input of the second optical filter unit. First light output from the second output of the first optical filter unit is converted into a first electrical signal having a level corresponding to the power of the first light, and second light output from the second output of the second optical filter unit is converted into a second electrical signal having a level corresponding to the power of the second light. A control signal is generated according to the first and second electrical signals. Then, the first and second optical filter units are controlled according to the control signal. According to this method, accurate tracking control of the optical filter can be achieved.

17 Claims, 5 Drawing Sheets

CONTROL METHOD AND DEVICE FOR OPTICAL FILTER

BACKGROUND OF THE INVENTION

1. Field of the Invention

The present invention relates to a control method and device for an optical filter.

2. Description of the Related Art

With an explosive increase in demand for data communication centered on the Internet traffic, high-capacity transmission and ultra long-haul transmission are desired in a backbone network. Further, since a variety of different services are offered to users, a highly reliable, flexible, and economical network is desired.

The high-capacity transmission and the ultra long-haul transmission are rapidly proceeding owing to the wavelength division multiplexing (WDM) technique and the optical amplifying technique, thereby allowing a reduction in transmission line cost. However, high-speed transmission and high-capacity transmission of signals increase the amount of information to be processed at network nodes, causing an increase in node cost and scale. Under such circumstances, the development of an optical add/drop multiplexer (OADM) and an optical cross-connect (OXC) is being pursued at a high pace, so as to reduce the cost and scale of the network nodes in such a manner that optical components are substituted for electronic circuits to perform a variety of processing on the basis of an optical path in the wavelength domain.

The OADM and the OXC employ many optical functional devices such as an optical switch having a function of switching on/off light, attenuating light, or switching between one input and n outputs, and an optical wavelength filter (optical filter) for selecting an optical signal according to wavelength. Of these optical functional devices, the optical filter is one of the key devices used for wavelength switching in the OXC and the OADM, wavelength separation at a receiving section, ASE (amplified spontaneous emission) noise cutting, etc.

In the OADM and the OXC, optical path switching is performed according to wavelength, so that the optical filter is required to have a wavelength tuning function of selecting a desired wavelength. With this wavelength tuning function, the transmission center wavelength of the optical filter can be tuned to coincide with a desired wavelength, thereby allowing the selection and separation on wavelength. In general, the wavelength of a transmitted light source has fluctuations, and the transmission center wavelength of the optical filter itself is also fluctuated by aged deterioration, environmental change, control error, etc. Therefore, it is necessary to perform tracking control for making the transmission center wavelength always coincide with a signal wavelength. For example, since even a slight deviation between the wavelength of transmitted light through the optical filter and the transmission center wavelength of the optical filter has a large effect on transmission characteristics or the like, a high-precision tracking technique is required. In the case of a notch filter, for example, the tracking control is performed by using an error signal obtained by extracting light having a desired wavelength and then monitoring the power of the light.

Further, an optical filter, e.g., a notch filter, for use in extracting an optical signal having a desired wavelength from a plurality of densely wavelength division multiplexed optical signals is required to have a filtering shape such that the adjacent channels with respect to the desired wavelength channel are not affected and that a sufficient rejection level can be obtained. In this case, the optical filter is generally configured by cascading a plurality of optical filter units for the purposes of improvement in rejection level and narrowing of a filtering band.

A generally considered tracking method for an optical filter, e.g., a notch filter, configured by cascading a plurality of optical filter units includes the steps of detecting monitor light from the optical filter unit on the first stage and controlling all the optical filter units by using the detected monitor light. However, the plural optical filter units cascaded have minute individual differences or the like, so that even when the same control signal is input to each optical filter unit, the transmission center wavelengths of all the optical filter units do not always completely coincide with each other in many cases. Accordingly, the filtering shape of the optical filter as a whole becomes different from that in the case where the transmission center wavelengths of all the optical filter units coincide with each other. If the tracking control is performed by using the monitor light obtained from the first-stage optical filter unit in this condition, the transmission center wavelength of the optical filter as a whole is deviated from the wavelength of an optical signal to be passed through the optical filter, because the transmission center wavelength of the first-stage optical filter unit is different from the transmission center wavelength of the optical filter.

The deviation of the transmission center wavelength of the optical filter from the wavelength of the optical signal causes a large deterioration in rejection characteristic. In the worst case due to this deviation, there is a possibility that an optical signal of another wavelength channel may be undesirably selected to cause a large transmission deterioration.

SUMMARY OF THE INVENTION

It is therefore an object of the present invention to improve an optical filter, a control method for the optical filter, or a control device for the optical filter, so as to achieve accurate tracking control of the optical filter.

In accordance with an aspect of the present invention, there is provided a control method for an optical filter including first and second optical filter units cascaded, each having an input and first and second outputs. The first output of the first optical filter unit is connected to the input of the second optical filter unit. First light output from the second output of the first optical filter unit is converted into a first electrical signal having a level corresponding to the power of the first light, and second light output from the second output of the second optical filter unit is converted into a second electrical signal having a level corresponding to the power of the second light. A control signal is generated according to the first and second electrical signals. Then, the first and second optical filter units are controlled according to the control signal.

According to this method, the control signal is generated by suitably weighting the first and second electrical signals and next adding them together, for example, thereby allowing suppression of a control error due to loss or the like in each optical filter unit.

In accordance with another aspect of the present invention, there is provided a control device for an optical filter including first and second optical filter units cascaded, each having an input and first and second outputs. The first output of the first optical filter unit is connected to the input of the second optical filter unit. The control device includes a first converter for converting first light output from the second output of the first optical filter unit into a first electrical signal having a level corresponding to the power of the first light; a second converter for converting second light output from the second output of the second optical filter unit into a second electrical signal having a level corresponding to the power of the second light; a circuit for generating a control signal according to the first and second electrical signals; and a circuit for controlling the first and second optical filter units according to the control signal.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the drawings.

Figure 1:
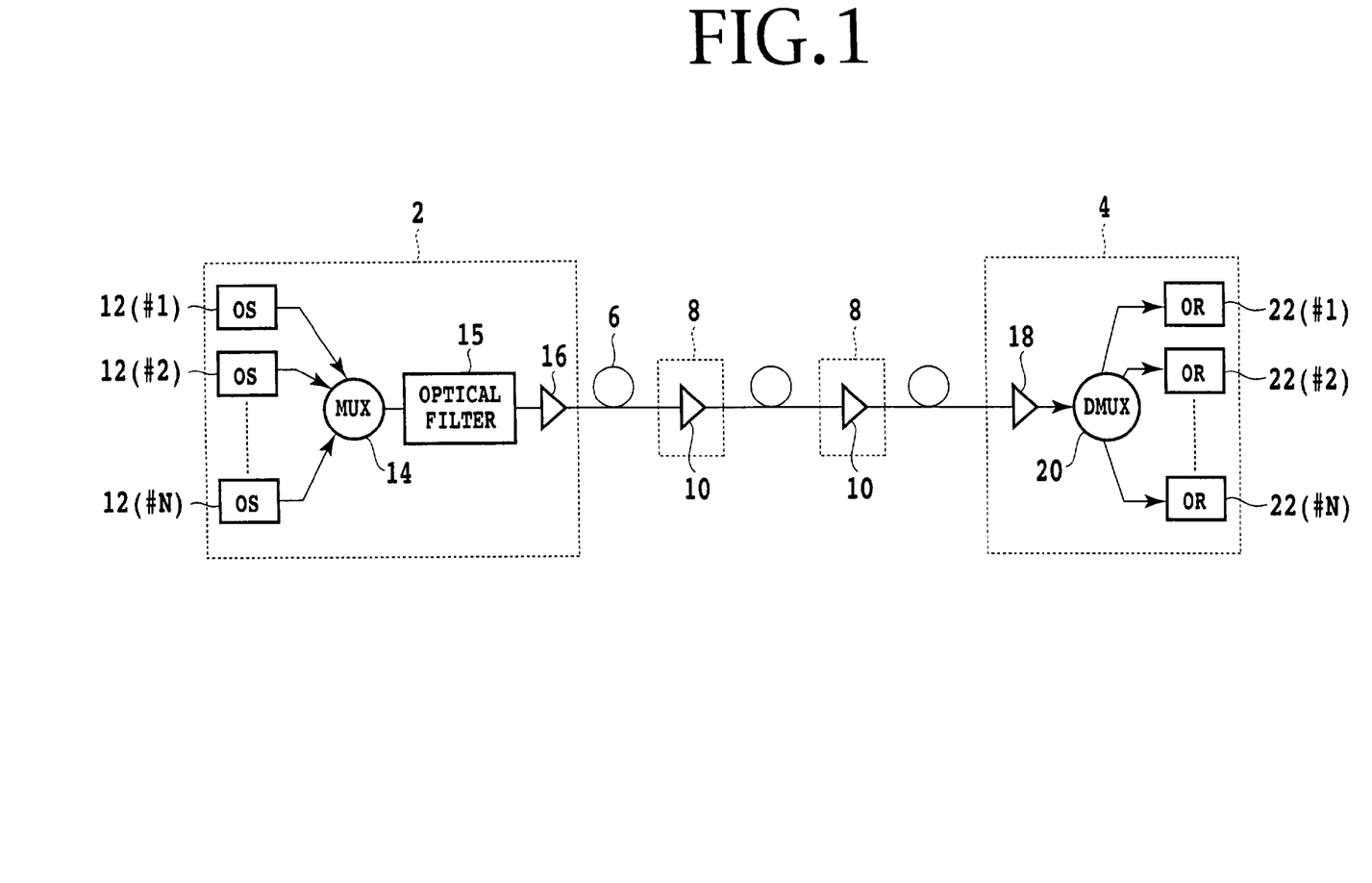
FIG. 1 is a block diagram of a system to which the present invention is applicable.

Referring to FIG. 1, there is shown a preferred embodiment of a system to which the present invention is applicable. This system includes a first terminal device 2, a second terminal device 4, an optical fiber transmission line 6 for connecting the terminal devices 2 and 4, and a plurality of (e.g., two as shown) optical repeaters 8 arranged along the optical fiber transmission line 6. Each optical repeater 8 includes an optical amplifier 10.

The first terminal device 2 includes a plurality of optical senders (OS) 12(#1) to 12(#N) (N is an integer greater than 1) for outputting a plurality of optical signals having different wavelengths, and an optical multiplexer (MUX) 14 for wavelength division multiplexing these optical signals and outputting resultant WDM signal light. The WDM signal light output from the optical multiplexer 14 is passed through an optical filter 15 characterized in the present invention, and next amplified by an optical amplifier 16. The WDM signal light amplified by the optical amplifier 16 is launched into the optical fiber transmission line 6.

The second terminal device 4 includes an optical amplifier 18 for amplifying the WDM signal light transmitted by the optical fiber transmission line 6, an optical demultiplexer (DMUX) 20 for separating the WDM signal light amplified by the optical amplifier 18 into a plurality of optical signals, and a plurality of optical receivers (OR) 22(#1) to 22(#N) for receiving these optical signals.

According to this system, loss of the WDM signal light can be compensated by the optical amplifiers 10, 16, and 18, thereby allowing long-haul transmission. Further, since WDM is applied to each of the terminal devices 2 and 4, a transmission capacity by the optical fiber transmission line 6 can be greatly increased according to the number of WDM channels, N.

The plural optical repeaters 8 may be replaced by a single optical repeater. Further, the optical repeaters 8 may be omitted depending on the transmission distance. Further, the optical amplifier 16 as a postamplifier or the optical amplifier 18 as a preamplifier may be omitted.

Figure 2:
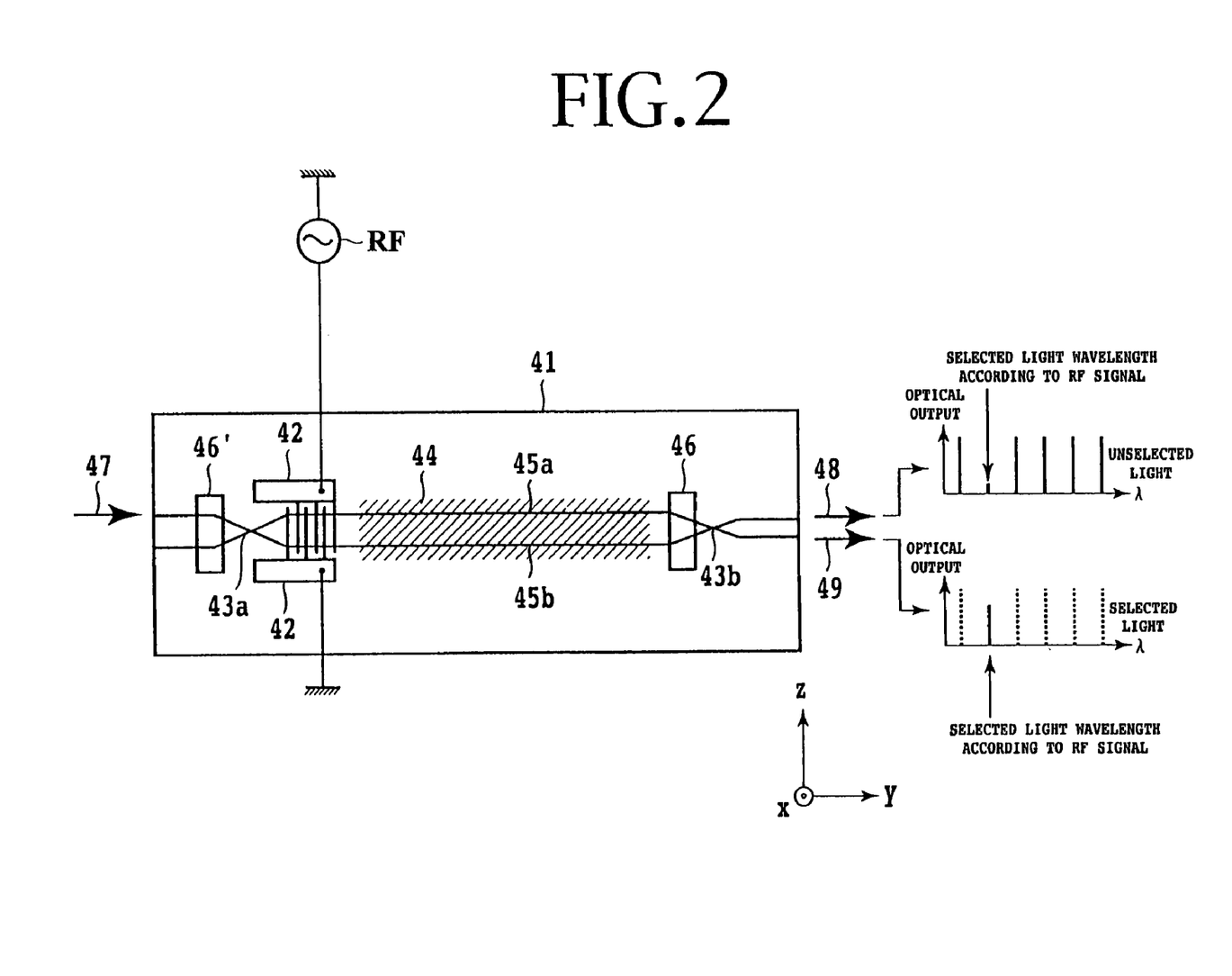
FIG. 2 is a schematic diagram showing an acoustooptic tunable filter (AOTF) usable in embodying the present invention.

FIG. 2 is a schematic diagram showing an AOTF (acousto-optic tunable filter) usable in embodying the present invention.

The AOTF includes a substrate 41 formed of lithium niobate ($LiNbO_3$), an IDT (interdigital transducer) 42 for generating a surface acoustic wave (SAW), polarization beam splitters 43a and 43b each for separating light into orthogonal polarization components, a SAW guide 44 for propagating the surface acoustic wave generated by the IDT 42, optical waveguides 45a and 45b for propagating the polarization components separated by the polarization beam splitter 43a, and SAW absorbers 46 and 46' each for absorbing the surface acoustic wave. Reference numerals 47, 48, and 49 denote input light, unselected light, and selected light, respectively.

Light propagated in a fiber (not shown) as the input light 47 enters the AOTF from an end surface of the substrate 41 to reach the polarization beam splitter 43a. The input light 47 supplied is spatially split into a TE component and a TM component by the polarization beam splitter 43a. The TM component propagates in the optical waveguide 45a to reach the polarization beam splitter 43b, and the TE component propagates in the optical waveguide 45b to reach the polarization beam splitter 43b. The polarization beam splitter 43b operates similarly to the polarization beam splitter 43a from a structural point of view, so that the TE component and the TM component are combined to be output as the unselected light 48.

When an RF signal is supplied to the IDT 42, a surface acoustic wave is generated on the substrate 41. The sound velocity of the surface acoustic wave is lower in the region of the SAW guide 44 than in the other region around the SAW guide 44, so that the surface acoustic wave generated is confined in the region of the SAW guide 44 during propagation. At this time, the light propagating in the optical waveguides 45a and 45b undergoes polarization plane rotation at a specific wavelength determined by the frequency of the RF signal supplied to the IDT 42. By adjusting the power of the RF signal so that 90° polarization plane rotation occurs just upstream of the polarization beam splitter 43b, the TM light propagating in the optical waveguide 45a is converted into TE light, and the TE light propagating in the optical waveguide 45b is converted into TM light before reaching the polarization beam splitter 43b. Then, the TE light and the TM light having the specific wavelength thus converted are transmitted by the polarization beam splitter 43b, and therefore output as the selected light 49.

In this manner, by propagating a surface acoustic wave in relation to an optical waveguide, light having a specific wavelength determined according to the power and frequency of the surface acoustic wave and the refractive index of the optical waveguide is subjected to mode conversion from the TE mode to the TM mode or vice versa (mode converter). Accordingly, by extracting the mode-converted light by any specific means such as a polarization beam splitter (e.g., the polarization beam splitter 43b shown in FIG. 2), WDM signal light can be separated into selected light and unselected light, or WDM signal light and ASE light existing in a band between any adjacent channels can be separated from each other. The wavelength of the selected light depends on the frequency of the surface acoustic wave, so that the wavelength of the selected light is tunable according to the frequency of the surface acoustic wave.

Figure 3:
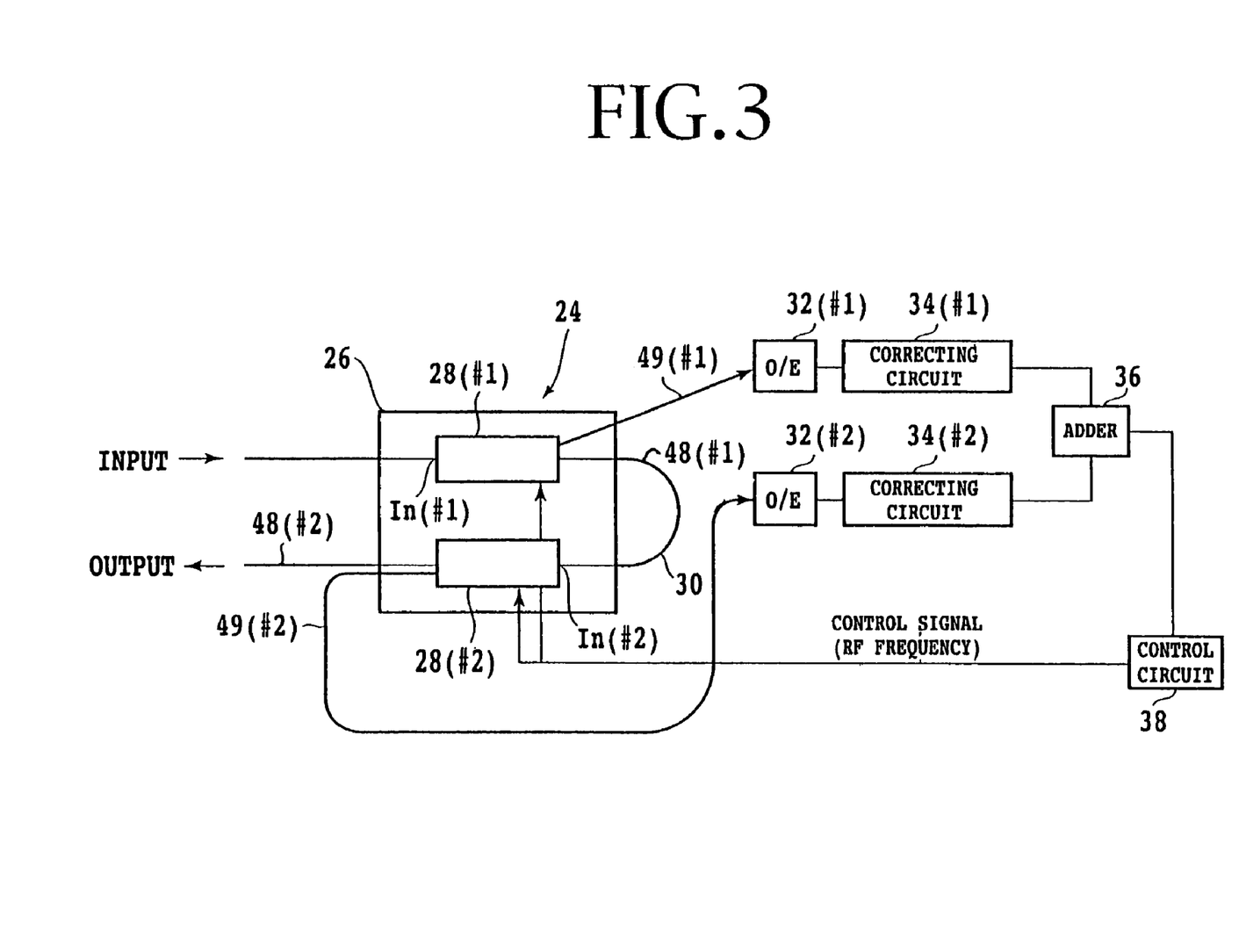
FIG. 3 is a schematic diagram showing a first preferred embodiment of the control device for the optical filter according to the present invention.

Referring to FIG. 3, there is shown a first preferred embodiment of the control device for the optical filter according to the present invention. Reference numeral 24 denotes an optical filter including a substrate 26 and two optical filter units 28(#1) and 28(#2) formed on the substrate 26. Each of the optical filter units 28(#1) and 28(#2) is an AOTF having the configuration shown in FIG. 2. The first optical filter unit 28(#1) has an input port In(#1) and two output ports 48(#1) and 49(#1). The second optical filter unit 28(#2) has an input port In(#2) and two output ports 48(#2) and 49(#2). The input port In(#1) of the first optical filter unit 28(#1) serves as an input port of the optical filter 24. The output port 48(#2) of the second optical filter unit 28(#2) serves as an output port of the optical filter 24. The output port 48(#1) of the first optical filter unit 28(#1) is connected through an optical fiber 30 to the input port In(#2) of the second optical filter unit 28(#2). The input port In(#1) of the first optical filter unit 28(#1) is provided to input the input light 47 shown in FIG. 2. The output ports 48(#1) and 49(#1) of the first optical filter unit 28(#1) are provided to output unselected light 48L(#1) and selected light 49L(#1), respectively. The input port In(#2) of the second optical filter unit 28(#2) is provided to input the unselected light 48L(#1). The output ports 48(#2) and 49(#2) of the second optical filter unit 28(#2) are provided to output unselected light 48L(#2) and selected light 49L(#2), respectively.

The input light 47 supplied to the input port of the optical filter 24 is WDM signal light output from the optical multiplexer 14 shown in FIG. 1, for example, and the unselected light 48L(#2) output from the output port of the optical filter 24 is WDM signal light to be amplified by the optical amplifier 16 shown in FIG. 1 and next launched into the optical fiber transmission line 6 shown in FIG. 1.

A SAW is generated from an IDT formed in the first optical filter unit 28(#1) by supplying an RF signal thereto. As a result, light having a wavelength according to the frequency of the RF signal undergoes polarization plane rotation, and is then output as the selected light 49L(#1) from the output port 49(#1). This selected light 49L(#1) is supplied as monitor light to an O/E (opto/electric) converter 32(#1).

Further, light having the other wavelengths not according to the RF frequency is output as the unselected light 48L(#1) from the output port 48(#1). This unselected light 48L(#1) is supplied through the optical fiber 30 to the input port In(#2) of the second optical filter unit 28 (#2). As shown in FIG. 2, not all the quantity of light having a wavelength according to the RF frequency is selected to be output as the selected light 49L(#1) from the output port 49(#1), but a given quantity of this light is output together with the unselected light 48L(#1) from the output port 48(#1).

Similarly, a SAW is generated from an IDT formed in the second optical filter unit 28(#2) by supplying an RF signal thereto. As a result, light having a wavelength according to the frequency of the RF signal undergoes polarization plane rotation, and is then output as the selected light 49L(#2) from the output port 49(#2). This selected light 49L(#2) is supplied as monitor light to an O/E (opto/electric) converter 32(#2).

Further, light having the other wavelengths not according to the RF frequency is output as the unselected light 48L(#2) from the output port 48(#2). This unselected light 48L(#2) is output as the output light from the optical filter 24.

The RF frequencies supplied to the first and second optical filter units 28(#1) and 28(#2) are the same as the frequency of a control signal output from a control circuit 38.

The selected lights 49L(#1) and 49L(#2) from the first and second optical filter units 28(#1) and 28(#2) are converted into electrical signals by the O/E converters 32(#1) and 32(#2), respectively. These electrical signals from the O/E converters 32(#1) and 32(#2) are input into correcting circuits 34(#1) and 34(#2), respectively.

The correcting circuits 34(#1) and 34(#2) are provided to perform weighting for compensation for loss of the selected light from the second optical filter unit 28(#2) due to the fact that the selected light having a wavelength according to the RF frequency is output from the first optical filter unit 28(#1). Accordingly, it is possible to commonly handle the electrical signals from the O/E converters 32(#1) and 32(#2) converted from the selected lights having different levels output from the first and second optical filter units 28(#1) and 28(#2).

Outputs from the correcting circuits 34(#1) and 34(#2) are added together by an adder 36. The control circuit 38 uses the result of this addition to perform tracking of the RF frequency to be supplied to the first and second optical filter units 28(#1) and 28(#2) to adjust the RF frequency so that the loss of the selected light is minimized and the output level of the light having a wavelength according to the RF frequency is maximized.

With this configuration, a loss center wavelength in the whole of plural optical filter units can be controlled in the case of applying a common RF frequency to the plural optical filter units. Accordingly, higher-precision control is allowed as compared with the case of controlling the RF frequency by monitoring of a single optical filter unit.

According to this preferred embodiment, the correcting circuits 34(#1) and 34(#2) are used to weight the levels of the electrical signals from the O/E converters 32(#1) and 32(#2), respectively. Accordingly, when the control circuit 38 controls the optical filter units 28(#1) and 28(#2) so that the level of the output from the adder 36 becomes maximum or minimum, for example, a control error due to losses or the like in the optical filter units 28(#1) and 28(#2) can be suppressed.

Figure 4A:
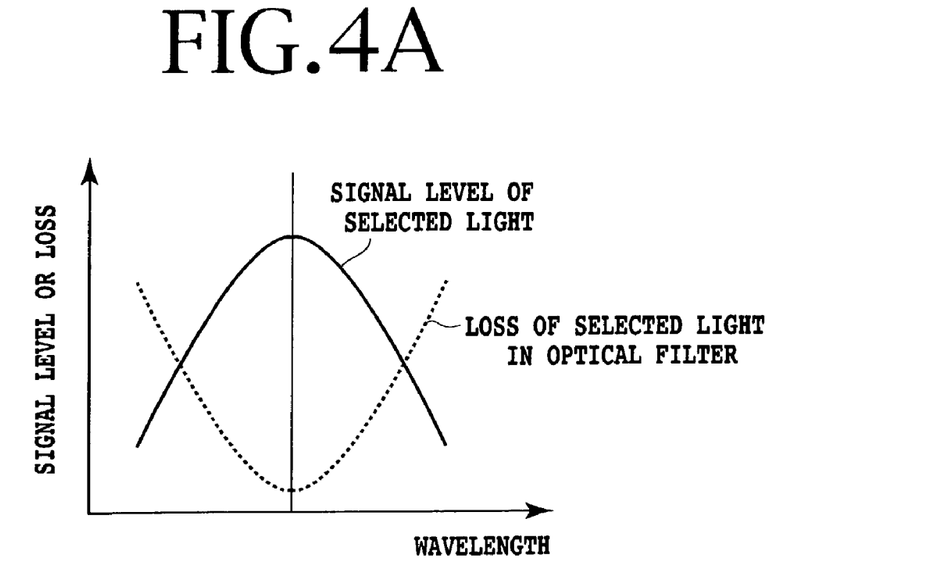
FIG. 4A is a graph showing a condition of control in the preferred embodiment of the present invention.

Referring to FIG. 4A, there is shown an overview of the result of the control in this preferred embodiment. In FIG. 4A, the solid line shows the level of the signal supplied from the adder 36 to the control circuit 38, and the broken line shows the transmission characteristic of the optical filter 24. As apparent from FIG. 4A, the center of the wavelength dependence shown by the solid line exactly coincides with the center of the wavelength dependence shown by the broken line as the result of the above-mentioned weighting.

Figure 4B:
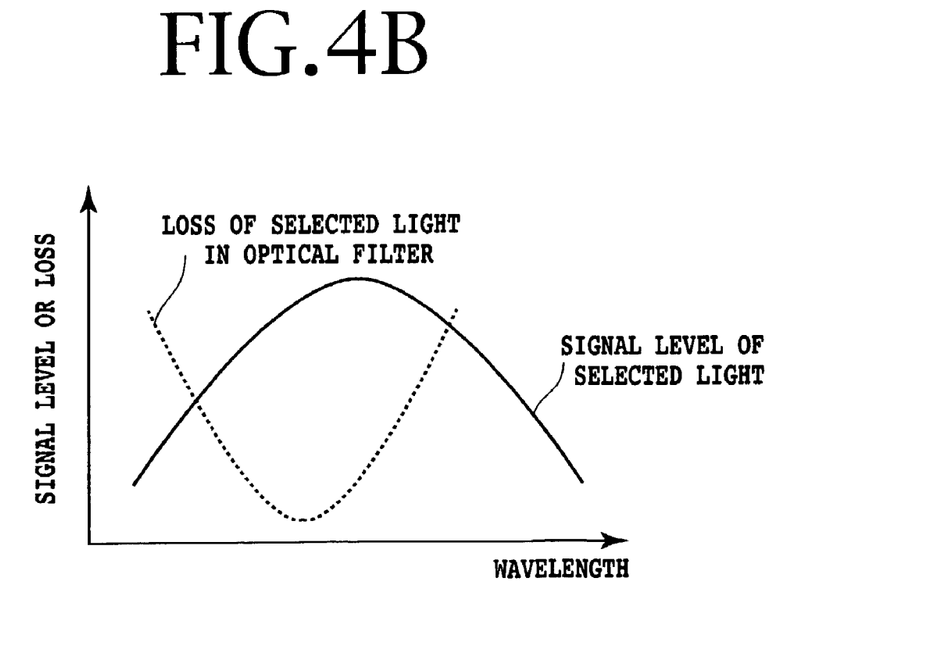
FIG. 4B is a graph showing a condition of control in the case that the present invention is not applied.

In contrast, if the weighting is not performed or only the monitor light from any one of the optical filter units 28(#1) and 28(#2) is subjected to the control, the center of the wavelength dependence shown by the solid line is deviated from the center of the wavelength dependence shown by the broken line as shown in FIG. 4B. Accordingly, the center wavelength of an optical signal cannot be made to exactly coincide with the center wavelength in the transmission characteristic of the optical filter 24 in the corresponding channel.

Accordingly, the weighting in the correcting circuits 34(#1) and 34(#2) is preferably performed according to the losses in the optical filter units 28(#1) and 28(#2) in embodying the present invention. For example, the weighting is performed so that the center wavelength in the wavelength dependence of the level of the control signal coincides with the center wavelength in the transmission characteristic of the optical filter 24.

The characteristics shown in FIGS. 4A and 4B are those in the case that each of the optical filter units 28(#1) and 28(#2) is a notch filter suitable for generating WDM signal light.

Figure 5:
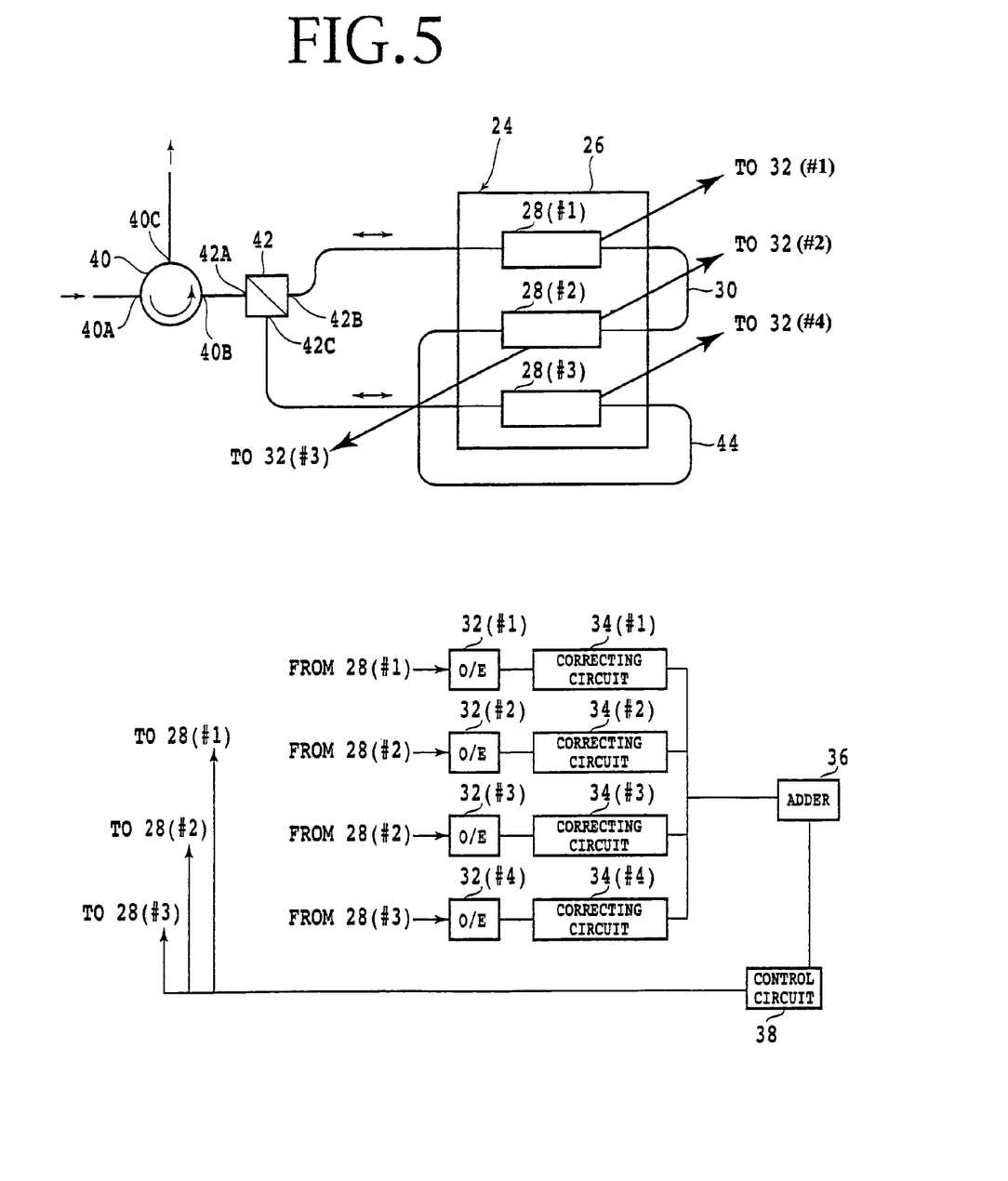
FIG. 5 is a schematic diagram showing a second preferred embodiment of the control device for the optical filter according to the present invention.

FIG. 5 is a schematic diagram showing a second preferred embodiment of the control device for the optical filter according to the present invention. In this preferred embodiment, the optical filter 24 further includes an optical filter unit 28(#3). This modification is accompanied by the addition of O/E converters 32(#3) and 32(#4) and correcting circuits 34(#3) and 34(#4).

Further, a polarization diversity loop is configured to eliminate polarization dependence in the optical filter units 28 (#1), 28 (#2), and 28 (#3). More specifically, an optical circulator 40 and a polarization beam splitter 42 are connected to the input and output of the optical filter 24.

The optical circulator 40 has ports 40A, 40B, and 40C, and functions so that light supplied to the port 40A is output from the port 40B, that light supplied to the port 40B is output from the port 40C, and that light supplied to the port 40C is output from the port 40A. In this preferred embodiment, however, the last function is not used.

The polarization beam splitter 42 has ports 42A, 42B, and 42C. The ports 42A and 42B are coupled by a polarization mode having a polarization plane parallel to the sheet plane of FIG. 5, and the ports 42A and 42C are coupled by a polarization mode having a polarization plane perpendicular to the sheet plane of FIG. 5.

The port 40B of the optical circulator 40 is connected to the port 42A of the polarization beam splitter 42. The port 42B of the polarization beam splitter 42 is connected to the input of the optical filter unit 28 (#1). The port 42C of the polarization beam splitter 42 is connected to the output of the optical filter unit 28 (#3). The output of the optical filter unit 28(#2) is connected to the input of the optical filter unit 28(#3). The ports 40A and 40C of the optical circulator 40 serve respectively as the input and output of the filter system including the optical filter 24, the optical circulator 40, and the polarization beam splitter 42.

The optical filter units 28(#2) and 28(#3) are connected by an optical fiber 44.

In the loop shown in FIG. 5, the monitor light selected from light propagating clockwise is supplied from the selected light outputs of the optical filter units 28(#1) and 28(#2) to the O/E converters 32(#1) and 32(#2), respectively, and the monitor light selected from light propagating counterclockwise is supplied from the selected light outputs of the optical filter units 28(#2) and 28(#3) to the O/E converters 32(#3) and 32(#4), respectively.

In the case that only the optical filter units 28(#1) and 28(#2) are used as in the first preferred embodiment, the weighting is performed in such a manner that when the loss in the first optical filter unit 28(#1) is −10 dB, the correction value for the monitor light power (dBm) is set to +10 dB.

In the second preferred embodiment using the three optical filter units 28(#1) to 28(#3), the weighting is performed in such a manner that when the losses in the first, second, and third optical filter units 28(#1), 28(#2), and 28(#3) are −3 dB, −6 dB, and −9 dB, the respective correction values are set to 0 dB, +3 dB, and +6 dB.

This correction method is based on the fact that the complementary shape of the characteristic of a notch filter after multistage transmission as obtained by incurring the loss in each stage and combining the filter characteristics in all the stages is the complementary shape to the composite shape of the monitor outputs containing the loss in each stage. In other words, this basis corresponds to the fact that the energy conservation law holds on the input and output of an optical signal.

Accordingly, by obtaining the complementary shape of the characteristic of the notch filter after multistage connection from the composite monitor output, the transmission center wavelength of the notch filter and the transmission center wavelength of the composite monitor output can be made to coincide with each other, thereby allowing high-precision tracking.

In each of the first and second preferred embodiments, the control circuit 38 supplies one RF frequency as a control signal to each optical filter unit to extract selected light having one wavelength. Alternatively, the control circuit 38 may supply a plurality of multiplexed RF frequencies to each optical filter unit to extract selected light having a plurality of wavelengths. In this case, by dithering a specific one of the plural RF frequencies, the power of the selected light having a wavelength according to the specific RF frequency is fluctuated.

With this fluctuation, the loss in the optical filter (the whole of the plural optical filter units) and the signal level for the specific RF frequency may be adjusted to a minimum value and a maximum value, respectively, thereby allowing the extraction of selected light having a plurality of wavelengths.

According to the present invention as described above, it is possible to provide a control method and device for an optical filter suitable for accurate tracking control of the optical filter.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A tracking control method for an optical filter including first and second optical filter units cascaded, each having an input and first and second outputs, said first output of said first optical filter unit being connected to said input of said second optical filter unit and light having a first wavelength is supplied to said input of said first optical filter unit, said tracking control method comprising:

converting first light output from said second output of said first optical filter unit into a first electrical signal having a level corresponding to the power of said first light;

converting second light output from said second output of said second optical filter unit into a second electrical signal having a level corresponding to the power of said second light;

weighting said first and second electrical signals according to losses in said first and second optical filter units;

adding said weighted first electrical signal and said weighted second electrical signal; and controlling said first and second optical filter units so as to make a center wavelength in a transmission characteristic of each of said first and second optical filter units coincide with said first wavelength according to said added signals.

2. A control method according to claim 1, wherein said generating comprises weighting said first and second electrical signals.

3. A control method according to claim 2, wherein said first and second electrical signals are weighted according to losses in said first and second optical filter units.

4. A control method according to claim 1, wherein said generating comprises weighting said first and second electrical signals so that a center wavelength in wavelength dependence of the level of said control signal coincides with a center wavelength in a transmission characteristic of said optical filter.

5. A control method according to claim 1, wherein said controlling comprises controlling a parameter on which a center wavelength in a transmission characteristic of each of said first and second optical filter units depends, according to said control signal.

6. A control method according to claim 5, wherein each of said first and second optical filter units comprises an acousto-optic tunable filter, and said parameter comprises the frequency of an AC signal to be supplied to said acousto-optic tunable filter.

7. A control method according to claim 1, wherein each of said first and second optical filter units comprises an acousto-optic tunable filter.

8. A control method according to claim 1, wherein each of said first and second optical filter units comprises a notch filter.

9. A tracking control device for an optical filter including first and second optical filter units cascaded, each having an input and first and second outputs, said first output of said first optical filter unit being connected to said input of said second optical filter unit and light having a first wavelength is supplied to said input of said first optical filter unit, said tracking control device comprising:
 a first converter converting first light output from said second output of said first optical filter unit into a first electrical signal having a level corresponding to the power of said first light;
 a second converter converting second light output from said second output of said second optical filter unit into a second electrical signal having a level corresponding to the power of said second light;
 a circuit weighting said first and second electrical signals according to losses in said first and second optical filter units;
 a circuit adding said weighted first electrical signal and said weighted second electrical signal; and
 a circuit controlling said first and second optical filter units so as to make a center wavelength in a transmission characteristic of each of said first and second optical filter units coincide with said first wavelength according to said added signals.

10. A control device according to claim 9, wherein said generating circuit comprises first and second correcting circuits for respectively weighting outputs from said first and second converters, and an adder for adding outputs from said first and second correcting circuits.

11. A control device according to claim 9, wherein said generating circuit comprises a circuit for weighting said first and second electrical signals.

12. A control device according to claim 11, wherein said first and second electrical signals are weighted according to losses in said first and second optical filter units.

13. A control device according to claim 9, wherein said generating circuit weights said first and second electrical signals so that a center wavelength in wavelength dependence of the level of said control signal coincides with a center wavelength in a transmission characteristic of said optical filter.

14. A control device according to claim 9, wherein said controlling circuit controls a parameter on which a center wavelength in a transmission characteristic of each of said first and second optical filter units depends, according to said control signal.

15. A control device according to claim 14, wherein each of said first and second optical filter units comprises an acousto-optic tunable filter, and said parameter comprises the frequency of an AC signal to be supplied to said acousto-optic tunable filter.

16. A control device according to claim 9, wherein each of said first and second optical filter units comprises an acousto-optic tunable filter.

17. A control device according to claim 9, wherein each of said first and second optical filter units comprises a notch filter.

* * * * *